US008467824B2

(12) United States Patent
Lin et al.

(10) Patent No.: US 8,467,824 B2
(45) Date of Patent: Jun. 18, 2013

(54) COMMUNICATION APPARATUS CAPABLE OF ACCESSING MULTIPLE TELECOMMUNICATION NETWORKS OF THE SAME TELECOMMUNICATION STANDARD

(75) Inventors: Feng-Yi Lin, Taipei Hsien (TW); Po-Hsiu Chien, Taipei Hsien (TW); Chen-Ji Chuang, Taipei Hsien (TW); Mei-Chien Liu, Taipei Hsien (TW)

(73) Assignee: Wistron NeWeb Corporation, Hsi-Chih, Taipei (TW)

( * ) Notice: Subject to any disclaimer, the term of this patent is extended or adjusted under 35 U.S.C. 154(b) by 979 days.

(21) Appl. No.: 12/053,627

(22) Filed: Mar. 24, 2008

(65) Prior Publication Data

US 2008/0293414 A1      Nov. 27, 2008

(30) Foreign Application Priority Data

May 23, 2007 (TW) .............................. 96118371 A

(51) Int. Cl.
*H04W 4/00* (2009.01)
*H04B 1/38* (2006.01)

(52) U.S. Cl.
USPC .................. 455/550.1; 455/435; 455/558

(58) Field of Classification Search
USPC ............... 455/435.2, 558, 33.1, 54.1, 89, 90, 455/550, 435; 379/58, 59, 63; 705/44
See application file for complete search history.

(56) References Cited

U.S. PATENT DOCUMENTS

| 5,687,216 | A | * | 11/1997 | Svensson | .................. 455/412.2 |
| 5,987,325 | A | | 11/1999 | Tayloe | |
| 6,889,059 | B1 | | 5/2005 | Fragola | |
| 2002/0042288 | A1 | | 4/2002 | Nakayama | |
| 2002/0154632 | A1 | | 10/2002 | Wang | |
| 2004/0019564 | A1 | * | 1/2004 | Goldthwaite et al. | .......... 705/44 |
| 2005/0181829 | A1 | | 8/2005 | Cho | |
| 2006/0234693 | A1 | | 10/2006 | Isidore | |
| 2008/0020765 | A1 | * | 1/2008 | Black et al. | ................ 455/435.2 |

FOREIGN PATENT DOCUMENTS

| CN | 1617607 A | 5/2005 |
| TW | I280035 | 4/2007 |

OTHER PUBLICATIONS

Office action mailed on Jan. 12, 2011 for the China application No. 200710106510.7, p. 3 line 3-29, and p. 4 line 1-3.

* cited by examiner

*Primary Examiner* — Nizar Sivji
(74) *Attorney, Agent, or Firm* — Winston Hsu; Scott Margo

(57) ABSTRACT

A communication apparatus for using a first and second subscriber identifications at the same time for accessing a first and second telecommunication networks correspondingly includes a first communication circuit for accessing the first telecommunication network according to the first subscriber identification; a second communication circuit for accessing the second telecommunication network according to the second subscriber identification, where the first telecommunication network and the second telecommunication network correspond to the same telecommunication standard; a central controlling device, with a user interface, for receiving a command; and a controller, coupled to the second communication circuit, for controlling operations of the second communication circuit, wherein the central controlling device is coupled to the first communication circuit and the controller, and the central controlling device is shared by the first communication circuit and the controller.

23 Claims, 10 Drawing Sheets

COMMUNICATION APPARATUS CAPABLE OF ACCESSING MULTIPLE TELECOMMUNICATION NETWORKS OF THE SAME TELECOMMUNICATION STANDARD

BACKGROUND OF THE INVENTION

1. Field of the Invention

The present invention relates to a communication apparatus, and more particularly, to a communication apparatus for using a first and second subscriber identifications at the same time for accessing a first and second telecommunication networks correspondingly to control extra short message service.

2. Description of the Prior Art

In recent times, utilizing mobile phones for communication has become increasingly popular. At any place and time, users can communicate with another one via calling, sending messages, sending mail etc. In the early stages of development, each mobile phone only had a single module, which only utilized a single subscriber identity module card, i.e. SIM card. As a result, a single mobile phone had a corresponding single phone number. When a user utilized two phone numbers or more than two phone numbers, the user had to buy two mobile phones or more than two mobile phones to meet his/her requirements.

As the communications market develops, telecommunication service agents have become numerous, and most users own more than two phone numbers. As a result, the users need to communicate with each other via more than two mobile phones. However, it is not convenient for users to carry two or more mobile phones, and this situation can also result in confusion when using mobile phones and increased financial expenditure.

SUMMARY OF THE INVENTION

Therefore, it is one of the objectives of the claimed invention to provide a communication apparatus of accessing multiple telecommunication networks corresponding to the same telecommunication standard, where the communication apparatus is capable of accessing an extra short message service via a short message service controller to solve the aforementioned problems.

According to an exemplary embodiment of the present invention, a communication apparatus for using a first and second subscriber identifications at the same time for accessing a first and second telecommunication networks correspondingly is disclosed. The communication apparatus comprises: a central controlling device, with a user interface, for receiving a command, a first communication circuit, for accessing the first telecommunication network according to a first subscriber identification, a second communication circuit, for accessing the second telecommunication network according to a second subscriber identification, wherein the first telecommunication network and the second telecommunication network correspond to the same telecommunication standard, and a controller, coupled to the second communication circuit, for controlling operations of the second communication circuit, wherein the central controlling device is coupled to the first communication circuit and the controller, and the central controlling device is shared by the first communication circuit and the controller According to an exemplary embodiment of the present invention, a communication apparatus for using a first and second subscriber identifications at the same time for accessing a first and second telecommunication networks correspondingly is further disclosed. The communication apparatus comprises: a first communication circuit, for accessing the first telecommunication network according to the first subscriber identification; a second communication circuit, for accessing the second telecommunication network according to the second subscriber identification, wherein the first telecommunication network and the second telecommunication network correspond to the same telecommunication standard; a central controlling device, with a user interface, for receiving a command; and a controller, coupled to the second communication circuit, for controlling operations of the second communication circuit, wherein an AT command approach is utilized for transmitting instructions and data between the controller and the second communication circuit.

According to an exemplary embodiment of the present invention, a communication apparatus for using a first and second subscriber identifications at the same time for accessing a first and second telecommunication networks correspondingly is further disclosed. The communication apparatus comprises: a first communication circuit, for accessing the first telecommunication network according to the first subscriber identification; a second communication circuit, for accessing the second telecommunication network according to the second subscriber identification, wherein the first telecommunication network and the second telecommunication network correspond to the same telecommunication standard; a central controlling device, with a user interface, for receiving a command; and a controller, coupled to the second communication circuit, for controlling operations of the second communication circuit, wherein a binary approach is utilized for transmitting instructions and data between the controller and the second communication circuit.

The present invention provides a communication apparatus, such as a mobile phone, with a short message service controller to simultaneously utilize multiple subscriber identity module cards (SIM card) for a single handheld communication device to perform short message operations. Furthermore, the present invention further provides a method for using a first and second subscriber identifications at the same time for accessing a first and second telecommunication networks correspondingly. The method utilizes an AT command form or a binary form to perform transmission for both the short message data and short message controlling indications.

According to an exemplary embodiment of the present invention, a method for using a first and second subscriber identifications at the same time for accessing a first and second telecommunication networks correspondingly is further disclosed. The method comprises: detecting whether a first subscriber identity module card and a second subscriber identity module card are installed respectively on a first communication circuit and a second communication circuit of the communication apparatus or not, wherein the first communication circuit accesses the first telecommunication network according to the first subscriber identity module card, and the second communication circuit accesses the second telecommunication network according to the second subscriber identity module card, and the first telecommunication network and the second telecommunication network correspond to the same telecommunication standard; and deciding whether an initialization procedure is started for detecting a usable short message storage capacity of the second subscriber identity module card according to the aforementioned detection result, and reading the short message and storing the short message into a system storage device of the communication apparatus according to the usable short message storage capacity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
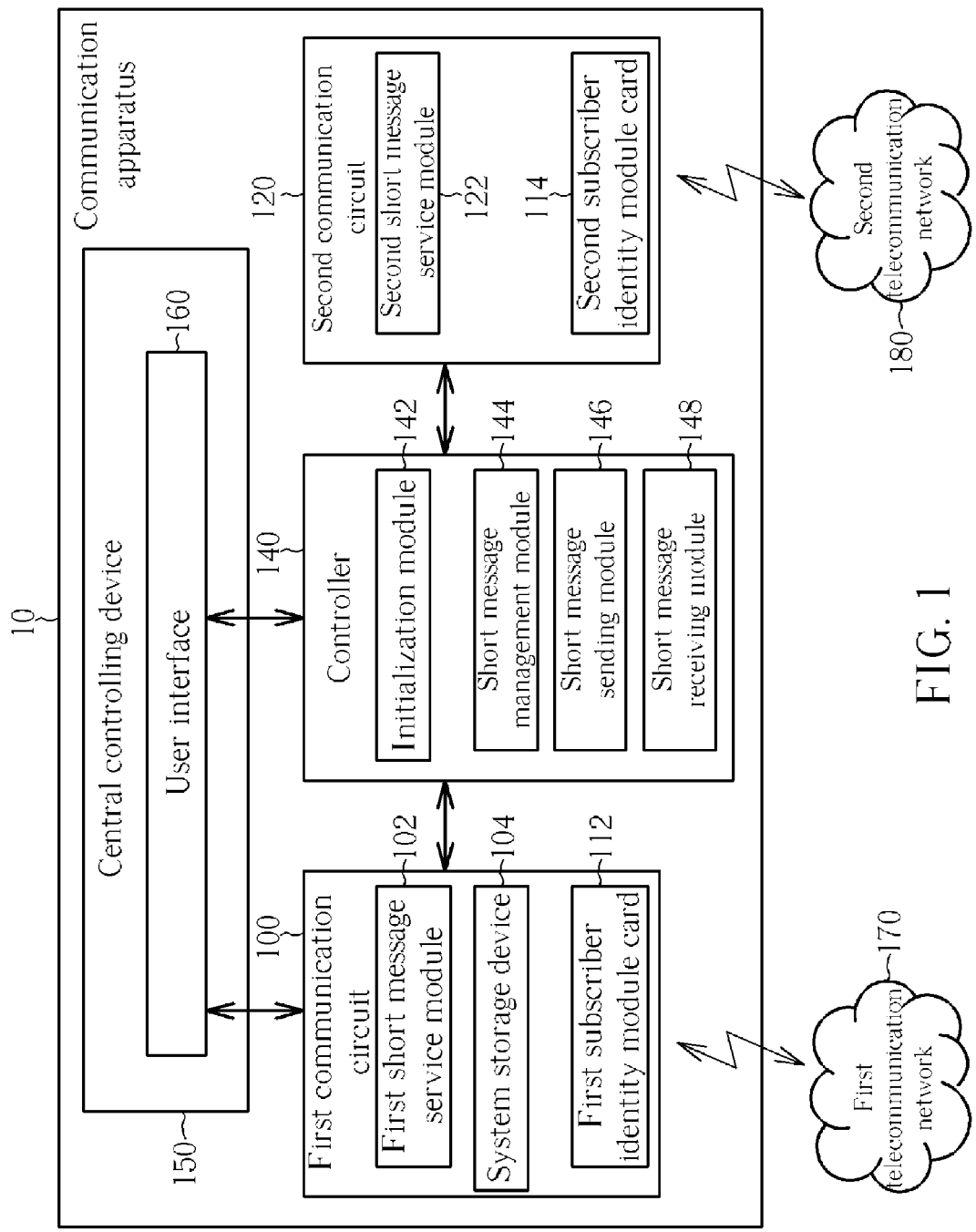
FIG. 1 is a block diagram illustrating a communication apparatus for using a first and second subscriber identifications at the same time for accessing a first and second telecommunication networks correspondingly according to one embodiment of the present invention.

Please refer to FIG. 1. FIG. 1 is a block diagram illustrating an exemplary embodiment of a communication apparatus 10 for using a first and second subscriber identifications at the same time for accessing a first telecommunication network 170 and second telecommunication network 180 correspondingly according to one embodiment of the present invention, wherein the communication apparatus 10 comprises a first communication circuit 100, for accessing the first telecommunication network 170 according to the first subscriber identification, recorded in a first subscriber identity module card 112; a second communication circuit 120, for accessing the second telecommunication network 180 according to the second subscriber identification, recorded in a second subscriber identity module card 114, wherein the first telecommunication network 170 and the second telecommunication network 180 correspond to the same telecommunication standard, such as Global System for Mobile Communications (GSM) standard, Personal Handyphone System (PHs) or other available mobile communication system standards; a controller 140, coupled to the second communication circuit 120, for controlling operations of the second communication circuit 120, wherein the central controlling device 150 is coupled to the first communication circuit 100 and the controller 140, and the central controlling device 150 is shared by the first communication circuit 100 and the controller 140. In other words, in this embodiment, the controller 140 is a dual mode short message service controller, for controlling short message processes of the second communication circuit 120 (the detailed functions and the operations of the controller 140 will be described in the following); and a central controlling device 150 with a user interface 160 (i.e. a man-machine interface) for receiving a command, wherein the user interface 160 is shared by the first communication circuit 100 and the controller 140, i.e. in this embodiment, the communication apparatus 10 sets one user interface 160 in the central controlling device 150. Accordingly, in this embodiment, the communication apparatus 10 is a handheld communication device, for example, a mobile phone or a Personal Digital Assistant (PDA).

In addition, in FIG. 1, the first communication circuit 100 comprises a message service module such as a first short message service module 102, and further comprises a system storage device 104, wherein the first short message service module 102 processes short message receiving/sending operations corresponding to the first telecommunication network 170, and the system storage device 104 is a main storage device of the communication apparatus 10, wherein the system storage device 104 generally has a huge storage size and stores most short messages received by the communication apparatus 10. The second communication circuit 120 comprises a message service module such as a second short message service module 122, for processing short message receiving/sending operations corresponding to the second telecommunication network 180. In this embodiment, the controller 140 comprises: an initialization module 142, for triggering an initialization procedure to validate (detect) a usable short message storage capacity of the second subscriber identity module card 114 corresponding to the second communication circuit 120; a short message management module 144, for managing reading, writing, copying, moving and deleting operations of the short messages, as in the initialization procedure, where the short message management module 144 reads the short message from the second subscriber identity module 114 according to the usable short message storage capacity detected in the initialization procedure and stores the short message into the system storage device 104; a message transmission module such as a short message sending module 146, for reading a target short message service center information received by a system configuration file of a target short message service center according to a subscriber configuration file of a target short message service center and then controlling the second communication circuit 120 to send a target short message according to the target short message service center information; and a short message receiving module 148, for controlling whether the short message receiving module 148 stores the target short message into the system storage device 104 or not according to at least one of the target short messages received by the second communication circuit 120 and a data storing state of the system storage device 104. Please note that architectures and principles of the aforementioned devices 102, 104, 112, 114, 122, 150 and 160 are well known in the art, and therefore not explained in detail here for the sake of brevity.

Figure 2:
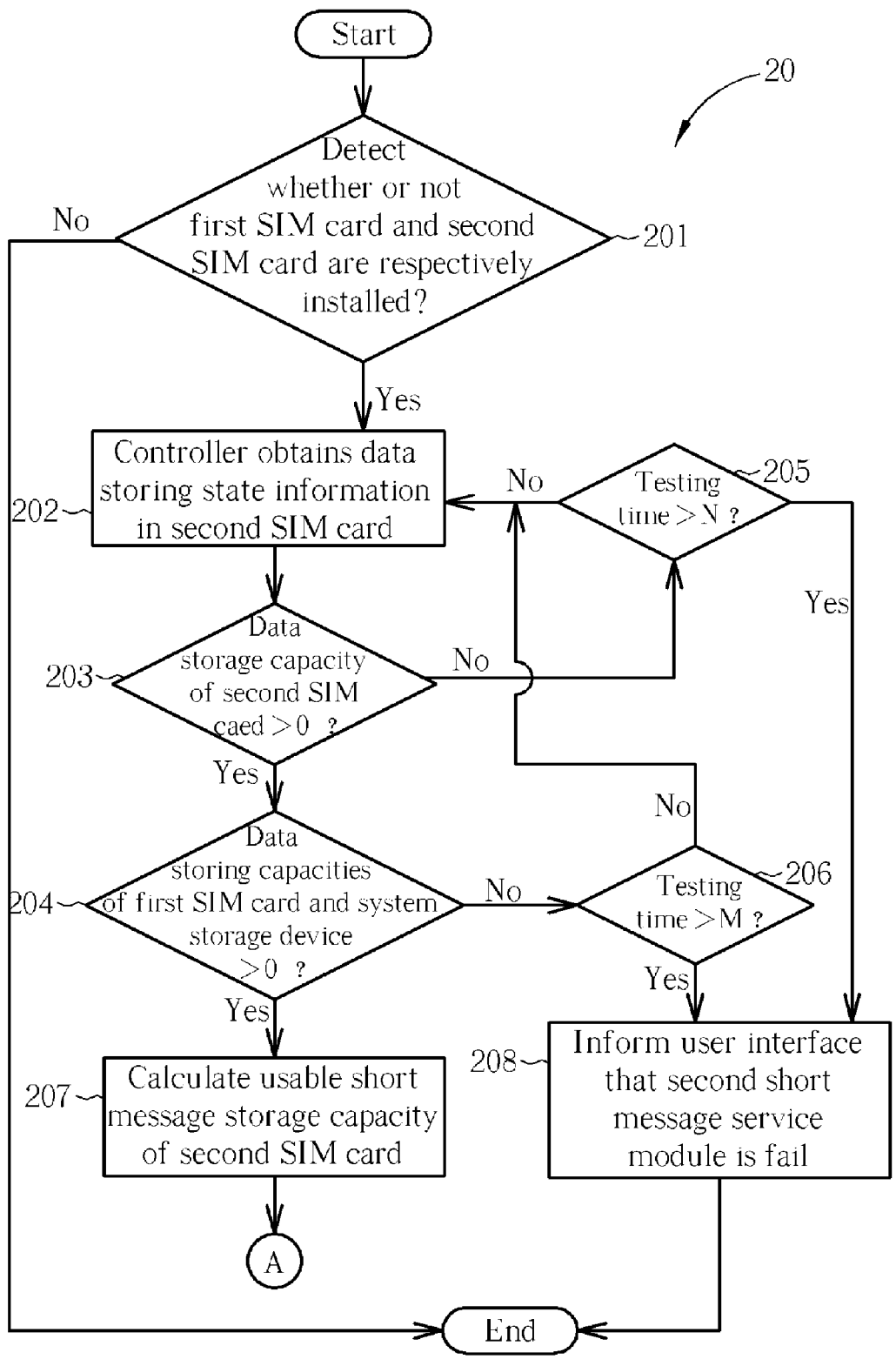
FIG. 2, FIG. 3 and FIG. 4 respectively illustrate a communication apparatus performing the initialization procedure shown in FIG. 1 through a controller.
Figure 3:
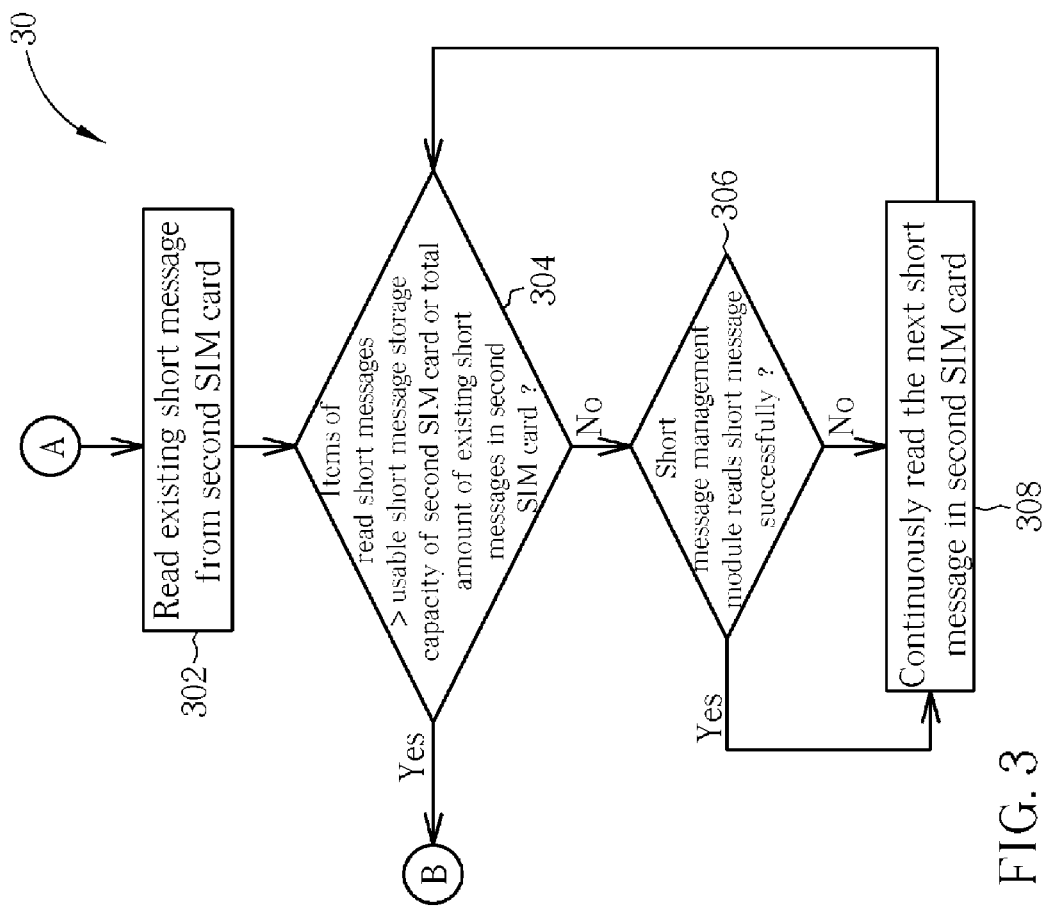
Figure 4:
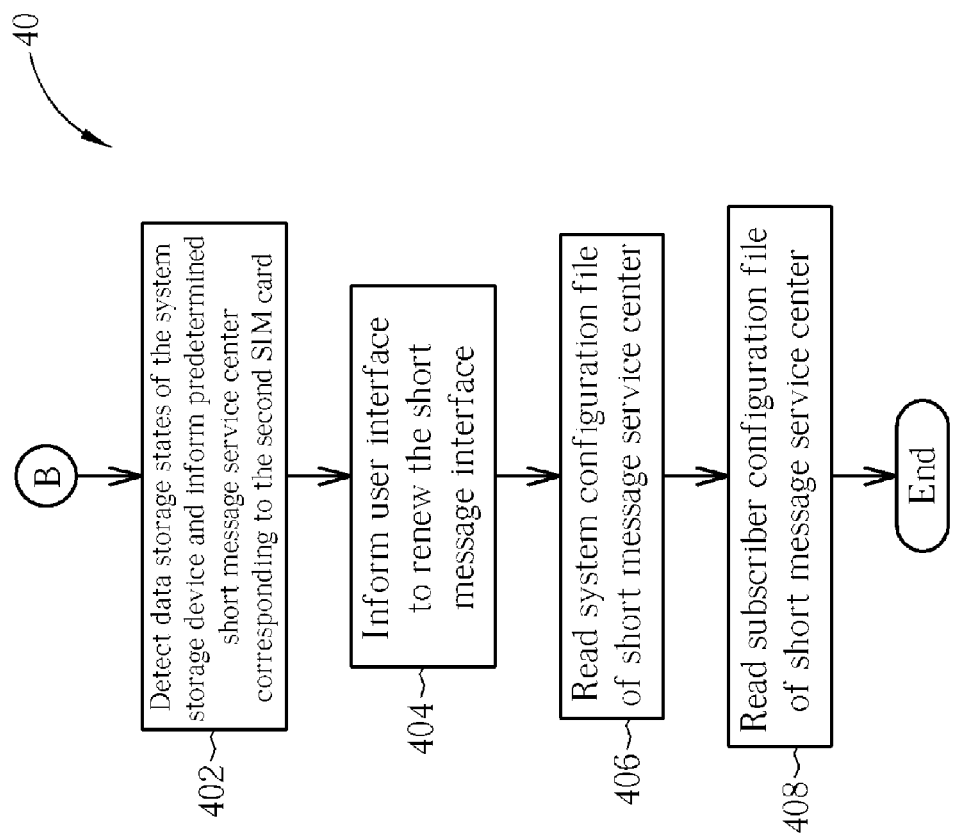

FIG. 2, FIG. 3 and FIG. 4 respectively illustrate a communication apparatus 10 performing the initialization procedure shown in FIG. 1 via the controller 140. In flow 20 as shown in FIG. 2, the initialization module 142 of the controller 140 will be triggered to detect whether or not a first subscriber identity module card and a second subscriber identity module card are respectively installed on the communication apparatus 10 (Step 201), if one or both are not installed, then flow 20 ends; otherwise, in Step 202, the controller 140 obtains a data storing state information in the second subscriber identity module card 114. In Step 203, the initialization module 142 detects whether the data storage capacity of the second subscriber identity module 114 is greater than zero according to the data storing state information. This step mainly detects whether the second subscriber identity module card 114 starts up correctly or not. If the above-mentioned data storage capacity is not greater than zero, then the initialization module 142 tests Step 203 continuously, furthermore, the initialization module 142 detects whether testing time is greater than N or not (in Step 205), wherein N can be set according to design requirements, such as N=3. If the testing time is greater than N, then in Step 208 the controller 140 informs the user interface 160 that the second short message service module 122 fails to start up successfully and ends flow 20. If the testing time is not greater than N, then flow 20 feeds back to Step 202 to perform testing continuously. In Step 204, if the data storage capacity of the second subscriber identity module 114 is greater than zero, then flow 20 continuously detects whether or not the data storing capacities of the first subscriber identity module card 112 and the system storage device 104 are greater than zero. Similarly, this operation is utilized for detecting whether or not the first subscriber identity module card 112 and the system storage device 104 start up correctly. If the first subscriber identity module card 112 and the system storage device 104 fail to start up successfully, then the initialization module 142 tests Step 204 continuously, furthermore, the initialization module 142 detects whether testing time is greater than M or not (in Step 206), where M can be set according to design requirements, such as M=5. If testing time is greater than M, then in Step 208 the controller 140 informs the user interface 160 that the second short message service module 122 fails to start up successfully and ends flow 20; if testing time is not greater than M, then flow 20 proceeds to Step 202 to perform testing continuously. In addition, if the data storing capacities of the first subscriber identity module card 112 and the system storage device 104 are greater than zero, then flow 20 calculates usable short message storage capacity of the second subscriber identity module card 114 (Step 207). Finally, flow 20 enters flow 30 as shown in FIG. 3.

It should be noted that, in FIG. 2, when detecting that testing time of Step 206 is not greater than M, flow 20 goes back to Step 202. In this situation, the initialization module 142 will re-examine whether or not the second short message service module 122 starts up successfully. However, in other implementations, when detecting that testing time of Step 206 is not greater than M, then flow 20 directly goes back to Step 204 and does not need to re-examine whether or not the second short message service module 122 starts up successfully. In addition, the procedure of detecting whether or not the second short message service module 122 starts up successfully, and the procedure of detecting whether or not the first short message service module 102 and the system storage device 104 start up successfully, are not limited to follow the exact order shown in FIG. 2. In other implementations, the initialization module 142 can firstly detect whether or not the first short message service module 102 and the system storage device 104 start up successfully, and later detect whether or not the second short message service module 122 starts up successfully.

Please refer to FIG. 3. FIG. 3 illustrates a flow 30 performing the following steps according to a calculation result in Step 207 as shown in FIG. 2. First, in Step 302, the short message management module 144 reads an existing short message from the second subscriber identity module card 114 according to usable short message storage capacity of the second subscriber identity module card 114. In Step 304, the short message management module 144 detects whether items of read short messages are greater than the usable short message storage capacity of the second subscriber identity module card 114 or the total amount of existing short messages in the second subscriber identity module card 114. If the detection result is true, then flow 30 will enter flow 40 as shown in FIG. 4. In Step 306, the controller 140 detects whether or not the short message management module 144 reads the short message successfully. Regardless of whether the short message management module 144 reads the short message successfully or not, the controller 140 will inform the user interface 160 to continuously read the next short message in the second subscriber identity module card 114 (Step 308). As a result, flow 30 goes back to Step 304 to perform iteratively until items of read short messages are greater than the usable short message storage capacity of the second subscriber identity module card 114 or the total amount of existing short messages in the second subscriber identity module card 114. In this embodiment, the short message management module 144 utilizes a one-by-one approach of reading short messages to read the existing short messages in the second subscriber identity module card 114, i.e. after the short message management module 144 has read one short message, the short message management module 144 should wait for information of the user interface 160 to continuously read a next short message in the second subscriber identity module card 114. As a result, losing a short message due to the short message not being stored into system storage device 104 in real time can be avoided.

Please refer to FIG. 4. Flow 40 should be activated after the short message management module 144 completes operations of reading the short message in second subscriber identity module card 114 as shown In FIG. 3. First, the initialization module 142 detects data storage states of the system storage device 104 and alternatively informs a predetermined short message service center corresponding to the second subscriber identity module card 114 according to the data storage states (in Step 402). For example, if a storage capacity of the system storage device 104 is not full, then the initialization module 142 may inform the predetermined short message service center that the system storage device 104 can still be utilized to store new short messages. The predetermined short message service center clearly decides whether the new short messages or the prior short messages received unsuccessfully by the second communication circuit 120 are transmitted into the communication apparatus 10. The initialization module 142 will inform the user interface 160 to renew the short message interface displaying configuration file, such as short message title, date, short message sender's name and etc. As a result, the user interface 160 clearly displays received current information to users (Step 404). In addition, in Step 406, the short message management module 144 reads at least a system configuration file of the short message service center from the second subscriber identity module card 114. For example, the system configuration file of the short message service center comprises address data of all usable short message service centers currently. In Step 408, the short message management module 144 reads at least a subscriber configuration file of the short message service center from the second subscriber identity module card 114. For instance, the subscriber configuration file of the short message service center records which short message service center is utilized by the user. Finally, controller 140 finishes and completes all initialization procedures.

Figure 5:
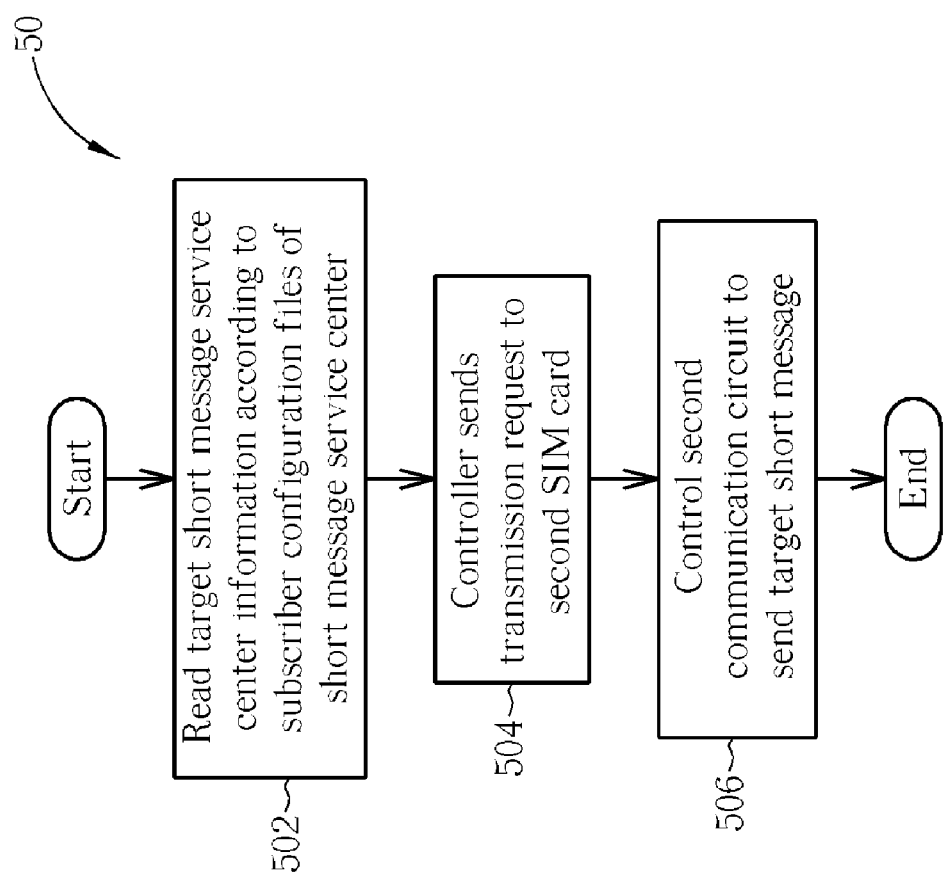
FIG. 5 is a flow chart of sending short messages through a controller for the communication apparatus shown in FIG. 1.

Please refer to FIG. 5. FIG. 5 is a flow chart of sending short messages through the controller 140 for the communication apparatus 10 shown in FIG. 1. In this flow 50, the short message sending module 146 reads a target short message service center information recorded by a system configuration file of a target short message service center according to a plurality of subscriber configuration files of a short message service center (Step 502), i.e. the short message sending module 146 reads the short message service center utilized by the second short message service module 122 during sending of the short message according to a user setting in the subscriber configuration files of a short message service center. In Step 504, the controller 140 sends a transmission request to the second subscriber identity module card 114, then the short message sending module 146 controls the second communication circuit 120 to send a target short message according to the target short message service center information (Step 506), and flow 50 ends.

Figure 6:
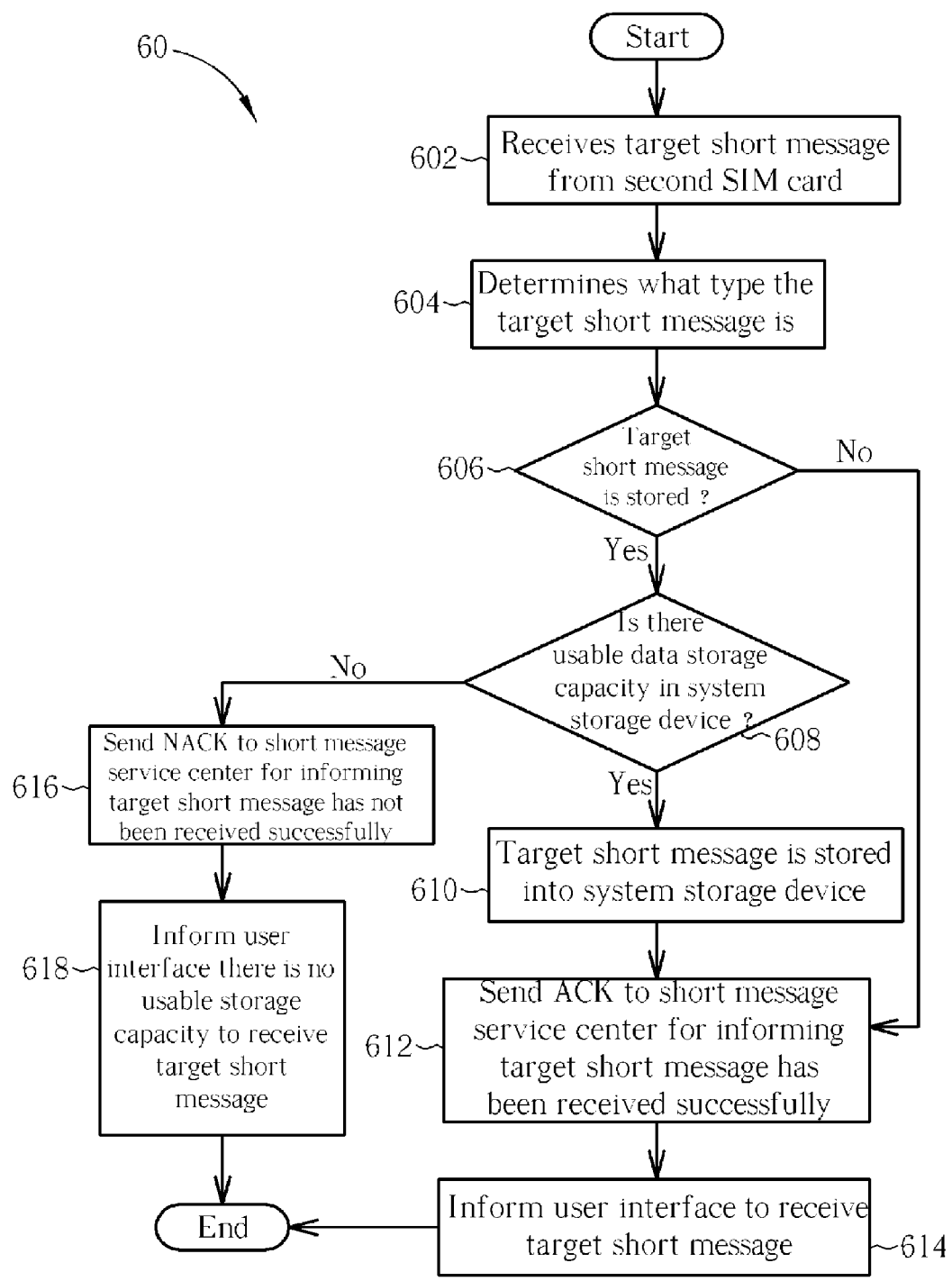
FIG. 6 is a flow chart of receiving short messages through a controller for the communication apparatus shown in FIG. 1.

Please refer to FIG. 6. FIG. 6 is a flow chart of receiving short messages through the controller 140 for the communication apparatus 10 shown in FIG. 1. When the second short message service module 122 of the second communication circuit 120 receives any short messages from the second telecommunication network 180, the second short message service module 122 will inform the controller 140. In flow 60, the short message receiving module 148 of the controller 140 receives a target short message from the second subscriber identity module card 114 (Step 602). Then, in Step 604, the short message receiving module 148 determines what type the target short message is. For example, the target short message may simply be a system acknowledgement message, so the target short message is only displayed and need not be stored. In addition, some short messages need to be stored into storage devices for users to access and read, for example, the system storage device 104, the first subscriber identity module card 112 or the second subscriber identity module card 114. It should be noted that, in this embodiment, the communication apparatus 10 stores all short messages received by the first telecommunication network 170 and the second telecommunication network 180 into the system storage device 104 in advance for avoiding storing data iteratively; however, this is only one implementation and does not meant to limit the scope of the present invention. As a result, in Step 606, the short message receiving module 148 detects whether or not the target short message is stored. If the target short message is not stored, then the short message receiving module 148 sends an acknowledgment to the aforementioned short message service center via the second short message service module 122 for informing that the aforementioned target short message has been received successfully (Step 612). In Step 614, the short message receiving module 148 informs the user interface 160 to receive the aforementioned target short message, and flow 60 ends. On the other hand, if the aforementioned target short message is stored, then in Step 608, the short message receiving module 148 detects whether or not there is a usable data storage capacity in the system storage device 104. If there is a usable data storage capacity in the system storage device 104, then in Step 610, the target short message will be stored into the system storage device 104. In Step 612, the short message receiving module 148 sends an acknowledgement to the aforementioned short message service center via the second short message service module 122 for informing that the aforementioned target short message has been received successfully. In addition, in Step 614, the short message receiving module 148 informs the user interface 160 to receive the aforementioned target short message, and flow 60 ends. If there is no usable data storage capacity in the system storage device 104, then in Step 616, the short message receiving module 148 sends a negative acknowledgement to the aforementioned short message service center via the second short message service module 122 for informing that the aforementioned target short message has not been received successfully. In addition, the short message receiving module 148 informs the user interface 160 that there is no usable storage capacity to receive the aforementioned target short message (in Step 618), and flow 60 ends.

Figure 7:
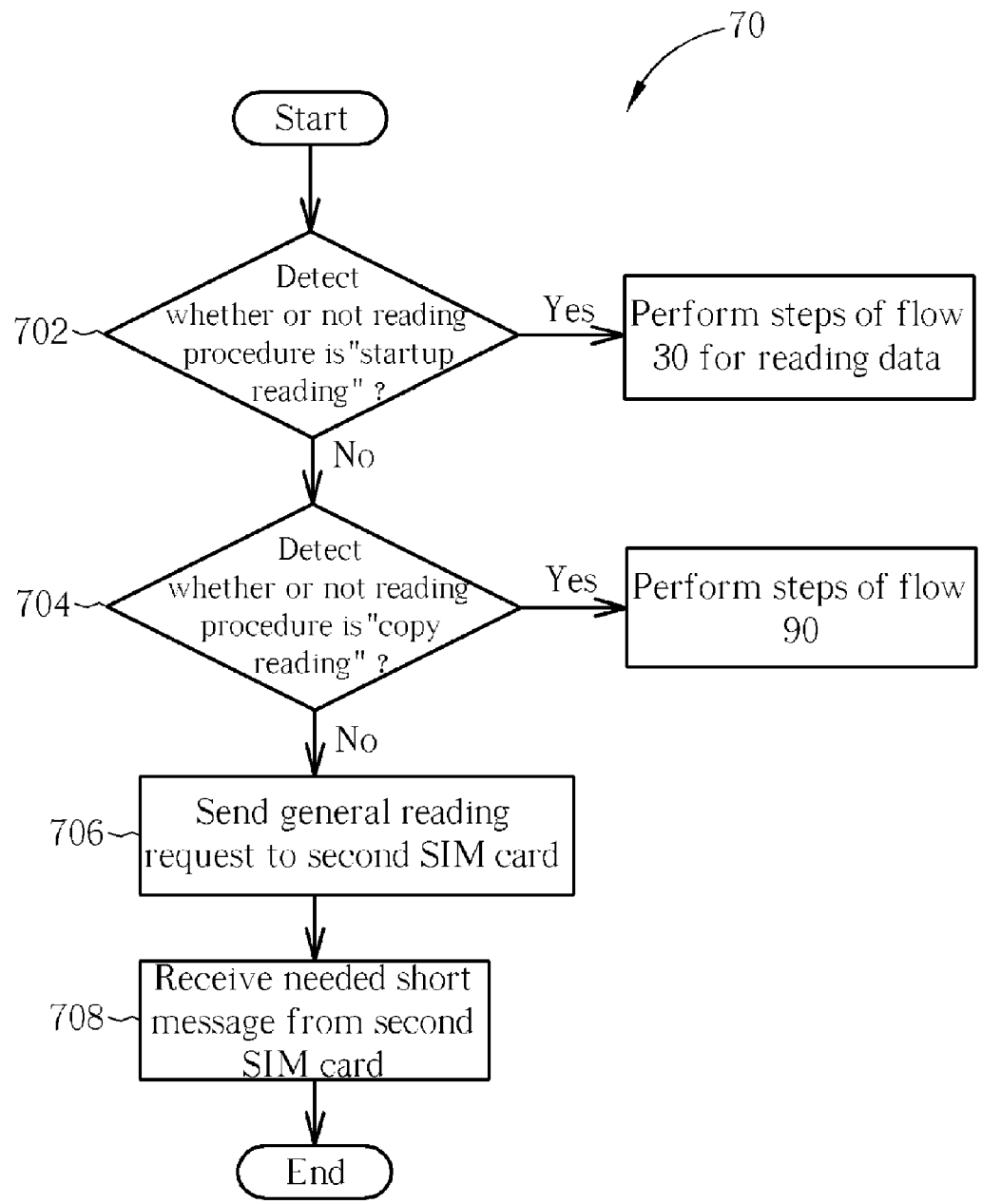
FIG. 7 is a flow chart of reading short messages through a controller for the communication apparatus shown in FIG. 1.
Figure 9:
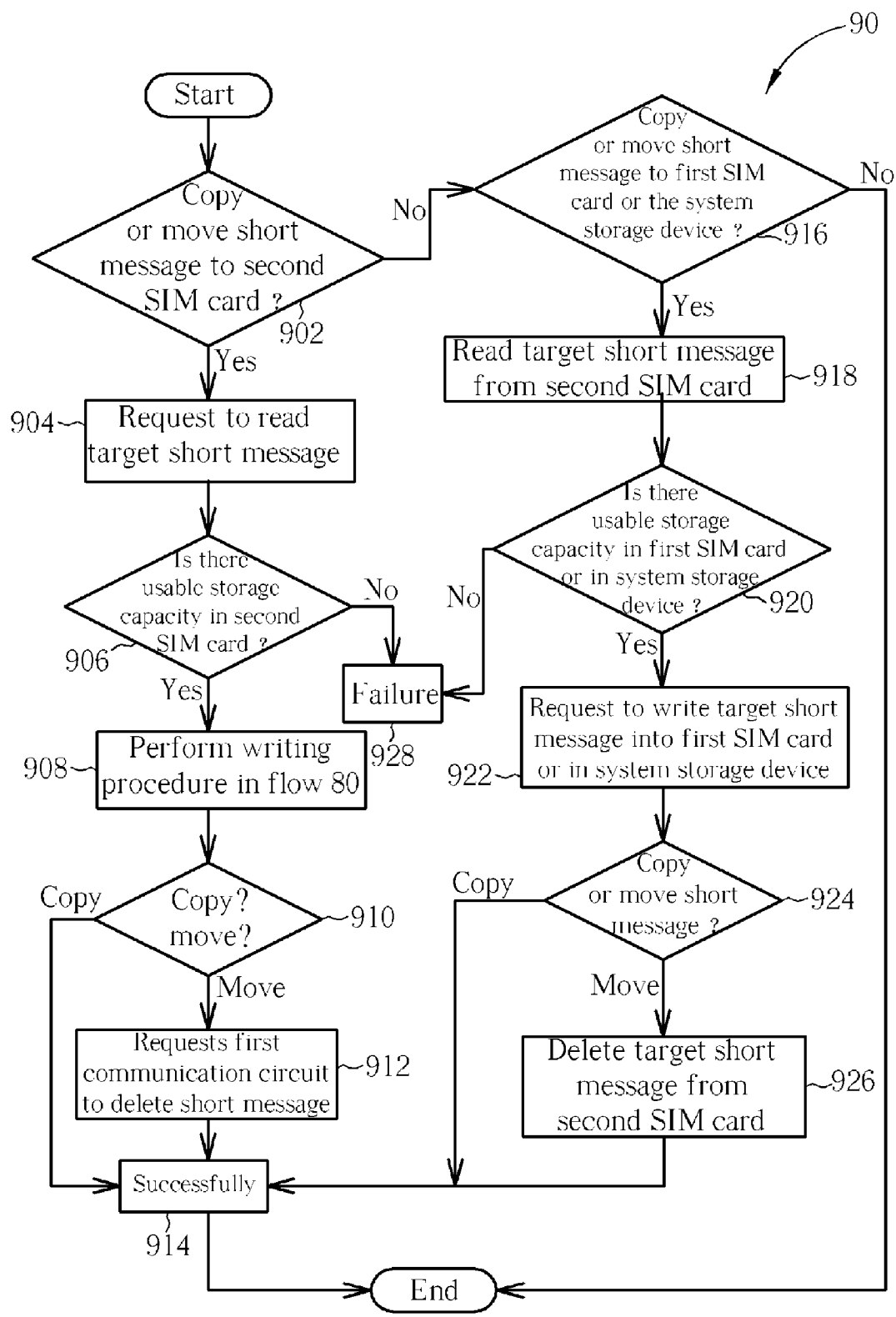
FIG. 9 is a flow chart of copying or moving short messages through a controller for the communication apparatus shown in FIG. 1.

Please refer to FIG. 7. FIG. 7 is a flow chart of reading short messages through the controller 140 for the communication apparatus 10 shown in FIG. 1. In this flow 70, the short message management module 144 detects whether or not a reading procedure is a "startup reading" (in Step 702). If the reading procedure is the startup reading, then the short message management module 144 performs the above-mentioned related steps shown in FIG. 3 for reading data. If the reading procedure is not the startup reading, then the short message management module 144 detects whether or not the reading procedure is a "copy reading" (in Step 704). If the reading procedure is a "copy reading", i.e. the reading procedure performs an operation of data copy, then the short message management module 144 performs steps following flow 90 as shown in FIG. 9. If the reading procedure is not a "copy reading", then in Step 706, the short message management module 144 sends a general reading request to the second subscriber identity module card 114, and in Step 708, the short message management module 144 receives the needed short message from the second subscriber identity module card 114, and flow 70 ends.

Figure 8:
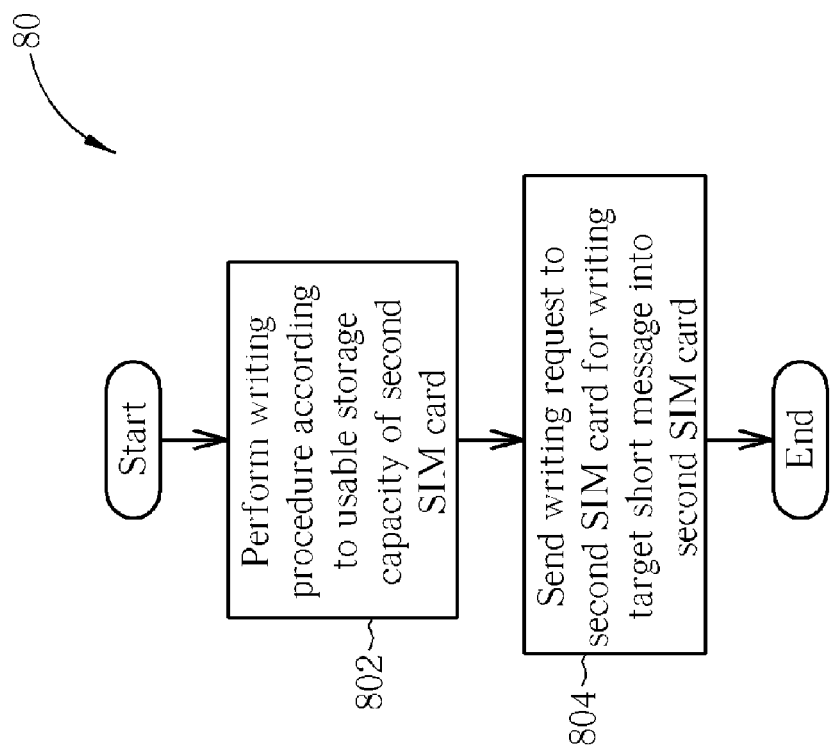
FIG. 8 is a flow chart of writing short messages through a controller for the communication apparatus shown in FIG. 1.

Please refer to FIG. 8. FIG. 8 is a flow chart of writing short messages through the controller 140 for the communication apparatus 10 shown in FIG. 1. In this flow 80, in Step 802, the short message management module 144 performs a writing procedure according to the usable storage capacity of the second subscriber identity module card 114 in the above-mentioned initialization procedure. In Step 804, the short message management module 144 sends a writing request to the second subscriber identity module card 114 for writing a target short message into the second subscriber identity module card 114, and flow 80 ends.

Please refer to FIG. 9. FIG. 9 is a flow chart of copying or moving short messages through the controller 140 for the communication apparatus 10 shown in FIG. 1. In this flow 90, in Step 902, the short message management module 144 detects whether the controller 140 performs operations for copying or moving short messages from the first subscriber identity module card 112 or the system storage device 104 to the second subscriber identity module card 114. If the detection result is true, then in Step 904, the short message management module 144 requests the first communication circuit 100 via an application programming interface (API) not shown in FIG. 1 to read a target short message of the first subscriber identity module card 112 or the system storage device 104. Next, in Step 906, the short message management module 144 detects whether or not there is a usable storage capacity in the second subscriber identity module card 114. If there is a usable storage capacity in the second subscriber identity module card 114, then in Step 908, the short message management module 144 performs the aforementioned writing procedure in flow 80 shown in FIG. 8. If the operation performed by the short message management module 144 is moving the short message (Step 910), then in Step 912, the short message management module 144 further requests the first communication circuit 100 via an API to delete the said short message, and in Step 914, the short message management module 144 informs the user interface 160 that the said short message is moved successfully. On the other hand, if the operation performed by the short message management module 144 is copying the short message (Step 310), then in Step 914, the short message management module 144 informs the user interface 160 that the said short message is copied successfully. Accordingly, if Step 906 fails, then in Step 928, the short message management module 144 informs the user interface 160 that the said short message is copied or moved unsuccessfully.

If the short message management module 144 does not detect the aforementioned needed operations for copying or moving short messages from the first subscriber identity module card 112 or the system storage device 104 to the second subscriber identity module card 114 in Step 902, then flow 90 will execute Step 916. In this situation, the short message management module 144 detects whether or not the controller 140 needs to perform operations of copying or moving short messages from the second subscriber identity module card 114 to the first subscriber identity module card 112 or the system storage device 104. If the detection result is positive, then flow 90 performs Step 918, otherwise, flow 90 performs Step 920 and flow 90 ends. In Step 918, the short message management module 144 reads the said target short message from the second subscriber identity module card 114. In Step 920, the short message management module 144 requests the first communication circuit 100 to detect whether there is a usable storage capacity in the first subscriber identity module card 112 or in the system storage device 104. If Step 920 fails, then flow 90 jumps to Step 928 and flow 90 ends. Contrarily, if Step 920 is true, then in Step 922, the short message management module 144 further requests the first communication circuit 100 via the API to write the aforementioned target short message into the first subscriber identity module card 112 or in the system storage device 104. In addition, if the operation performed by the short message management module 144 is moving the short message (Step 924), then in Step 926, the controller 140 controls the second communication circuit 120 to delete the aforementioned target short message from the second subscriber identity module card 114, and in Step 914, the short message management module 144 informs the user interface 160 that the aforementioned target short message is moved successfully. If the operation performed by the short message management module 144 is copying the short message (Step 924), then in Step 914, the short message management module 144 informs the user interface 160 that the aforementioned target short message is copied successfully.

Figure 10:
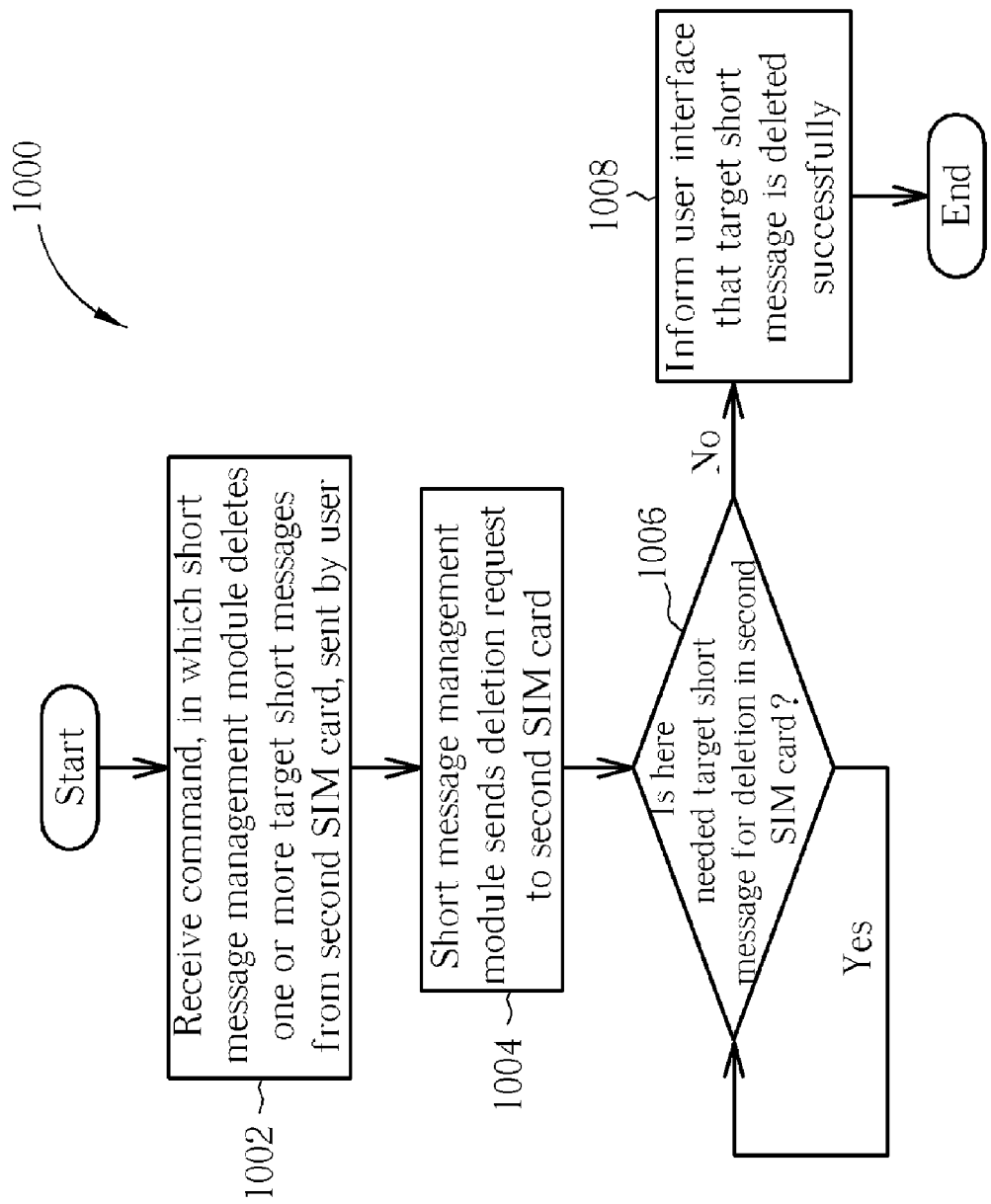
FIG. 10 is a flow chart of copying or moving short messages through a controller for the communication apparatus shown in FIG. 1.

Please refer to FIG. 10. FIG. 10 is a flow chart of copying or moving short messages through the controller 140 for the communication apparatus 10 shown in FIG. 1. In this flow 1000, in Step 1002, the short message management module 144 receives a command, in which the short message management module 144 deletes one or more target short messages from the second subscriber identity module card 114, sent by a user via the user interface 160. In Step 1004, the short message management module 144 sends a deletion request to the second subscriber identity module card 114. Accordingly, in Step 1006, the short message management module 144 detects whether or not there is a needed target short message for deletion in the second subscriber identity module card 114. If Step 1006 is true, then flow 1000 repeats the Step 1006 until the target short message corresponding to the deletion request is completely deleted from the second subscriber identity module card 114. If the short message management module 144 detects there is no needed target short message for deletion in the second subscriber identity module card 114, i.e. Step 1006 fails, then in Step 1008, the short message management module 144 informs the user interface 160 that the aforementioned target short message corresponding to the deletion request is deleted successfully, and flow 1000 ends.

The communication apparatus 10 of the present invention is a handheld communication device, such as a mobile phone or Personal Digital Assistant (PDA), wherein in the above-mentioned embodiment, the first telecommunication network 170 and the second telecommunication network 180 correspond to the same telecommunication standard. For example, the telecommunication standard complies with a Global System for Mobile Communications (GSM) standard. However, in the present invention, the first telecommunication network 170 and the second telecommunication network 180 are respectively a GSM standard and a Personal Handyphone System (PHS) standard.

In one implementation of the present invention, the first communication circuit 100 and the controller 140 are disposed on the same circuit board, and the second communication circuit 120 is disposed on another circuit board. In another implementation, the first communication circuit 100 is disposed on a circuit board, and the second communication circuit 120 and the controller 140 are both disposed on another circuit board. In addition, the two aforementioned circuit boards are disposed in parallel in the housing of the communication apparatus 10 according to a specific order or not, and the connection between the aforementioned circuit boards is through a transmission interface for transmitting control signals and data.

The aforementioned transmission interface in communication apparatus 10 of the present invention may be implemented using the prior art architecture. For example, the aforementioned transmission interface utilizes an AT command format to send control commands for controlling processes of the short message, and transmission of the short message data utilizes a binary format. As a result, transmitting a command between the controller 140 and the second communication circuit 120 performs respective operations about AT command translation on two sites (controller 140 and second communication circuit 120); however, data are allowed to be directly transmitted between the controller 140 and the second communication circuit 120 according to the binary format without any format translation. Accordingly, in another embodiment of the present invention, the aforementioned transmission interface may directly utilize an AT command format to send a control command for controlling processes of the short message and performing the transmission of the short message data. For example, the telecommunication standard of the first telecommunication network 170 is a GSM standard or PHS standard, and the telecommunication standard of the second telecommunication network 180 is a GSM standard or PHS standard. When a controlling command of the short message needs to be transmitted between the controller 140 and the second communication circuit 120, then the controlling command needs to perform respective operations about AT command translation on two sites. As a result, a data transmission between the controller 140 and the second communication circuit 120 needs to perform respective operations about AT command translation on two sites. In another embodiment of the communication apparatus 10 of the present invention, the aforementioned transmission interface may directly utilize a binary format to send a control command for controlling processes of the short message and performing the transmission of the short message data. For example, the telecommunication standard of the first telecommunication network 170 is a GSM standard or PHS standard, and the telecommunication standard of the second telecommunication network 180 is a GSM standard or PHS standard. When a controlling command of the short message needs to be transmitted between the controller 140 and the second communication circuit 120, then the controlling command is transmitted through the binary format without any format translation needed. Similarly, as the binary format is employed, the data are allowed to be directly transmitted between the controller 140 and the second communication circuit 120 without any format translation needed.

Those skilled in the art will readily observe that numerous modifications and alterations of the device and method may be made while retaining the teachings of the invention.

What is claimed is:

1. A communication apparatus for using a first and second subscriber identifications at the same time for accessing a first and second telecommunication networks correspondingly, comprising:
    a central controlling device, with a user interface, for receiving a command;
    a first communication circuit, for installing a first subscriber identity module card and accessing the first telecommunication network according to the first subscriber identification, wherein the first communication circuit comprises:
        a first short message service module for processing short message receiving/sending operations corresponding to the first telecommunication network;
    a second communication circuit, for installing a second subscriber identity module card and accessing the second telecommunication network according to the second subscriber identification, wherein the first telecommunication network and the second telecommunication network correspond to a same telecommunication standard, wherein the second communication circuit comprises:
        a second short message service module for processing short message receiving/sending operations corresponding to the second telecommunication network; and
    a controller, coupled to the second communication circuit, for controlling the second communication circuit, wherein the central controlling device is coupled to the first communication circuit and the controller, and the first communication circuit and the controller are controlled by signals from the central controlling device;
    wherein the controller further comprises:
        a message transmission module, for reading a target message service center information stored in a system configuration file according to a subscriber configuration file of a message service center, and controlling the second communication circuit to send a message according to the target message service center information.

2. The communication apparatus of claim 1, wherein the communication apparatus is a handheld communication device and the telecommunication standard complies with a global system for mobile communications (GSM) standard.

3. The communication apparatus of claim 1, wherein the communication apparatus is capable of receiving the first and second subscriber identity module (SIM) cards, and the first communication circuit further comprises a system storage device; and the controller comprises:
    an initialization module, for executing an initialization procedure to detect a usable storage capacity of the second SIM card corresponding to the second communication circuit; and
    a message management module, for reading messages from the second subscriber identity module card and storing the message in the system storage device.

4. The communication apparatus of claim 1, wherein the controller further comprises:
    a message receiving module, for controlling whether or not the target short message is stored into the system storage device according to at least a type of the target short message received by the second communication circuit and a data storing state of the system storage device.

5. The communication apparatus of claim 1, wherein the controller further comprises:
    a short message management module, for reading at least one target short message from a second identity card of the second communication circuit.

6. The communication apparatus of claim 1, wherein the controller further comprises:
    a short message management module, for writing at least one target short message into a second identity card of the second communication circuit.

7. The communication apparatus of claim 1, wherein the controller further comprises:
    a short message management module, for deleting at least one target short message in a second identity card of the second communication circuit.

8. The communication apparatus of claim 1, wherein an AT command approach is utilized for transmitting instructions and data between the controller and the second communication circuit.

9. The communication apparatus of claim 1, wherein a binary approach is directly utilized for transmitting indications and data between the controller and the second communication circuit.

10. A method for using a first and second subscriber identifications at the same time for accessing a first and second telecommunication networks correspondingly, comprising:
    detecting whether or not a first subscriber identity module card and a second subscriber identity module card are installed respectively on a first communication circuit and a second communication circuit of the communication apparatus, wherein the first communication circuit accesses the first telecommunication network according to the first subscriber identity module card, and the second communication circuit accesses the second telecommunication network according to the second subscriber identity module card, and the first telecommunication network and the second telecommunication network correspond to a same telecommunication standard;
    determining whether an initialization procedure is started for detecting a usable short message storage capacity of the second subscriber identity module card according to the detection result, and reading the short message and storing the short message into a system storage device of the communication apparatus according to the usable short message storage capacity; and
    providing a controller coupled to the second communication circuit, the controller comprising: a message transmission module, for reading a target message service center information stored in a system configuration file according to a subscriber configuration file of a message service center, and controlling the second communication circuit to send a message according to the target message service center information;
    wherein the first communication circuit comprises: a first short message service module for processing short message receiving/sending operations corresponding to the first telecommunication network; and the first communication circuit comprises the first subscriber identity module card when the first subscriber identity module card is installed on the first communication circuit; and the second communication circuit comprises: a second short message service module for processing short message receiving/sending operations corresponding to the second telecommunication network; and the second communication circuit comprises the second subscriber identity module card when the second subscriber identity module card is installed on the second communication circuit.

11. The method of claim 10, further comprising:
when reading the short message from the second subscriber identity module card, transmitting a read result of the target short message into a central controlling device of the communication apparatus, and reading the short message continuously according to the controlling of the central controlling device.

12. The method of claim 10, further comprising:
in the initialization procedure, detecting a data storing state and determining whether or not a predetermined short message service center is informed according to the data storing state.

13. The method of claim 10, further comprising:
in the initialization procedure, after reading the short message from the second subscriber identity module card, further informing the central controlling device to renew a short message interface displaying configuration file.

14. The method of claim 10, further comprising:
in the initialization procedure, further reading at least a system configuration file of the short message service center and a subscriber configuration file of the short message service center from the second subscriber identity module card.

15. The method of claim 10, further comprising:
in a reading procedure, reading at least a target short message from the second subscriber identity module card.

16. The method of claim 15, further comprising:
in the reading procedure, requesting the first communication circuit to write the target short message into the first subscriber identity module card or the system storage device.

17. The method of claim 15, further comprising:
in the reading procedure, controlling the second communication circuit to delete the target short message.

18. The method of claim 10, further comprising:
in a writing procedure, writing at least one target short message into the second subscriber identity module card.

19. The method of claim 18, further comprising:
in the writing procedure, requesting the first communication circuit to read the target short message in the first subscriber identity module card or the system storage device.

20. The method of claim 18, further comprising:
in the writing procedure, requesting the first communication circuit to delete the target short message.

21. The method of claim 10, further comprising:
in a deleting procedure, deleting at least one target short message from the second subscriber identity module card.

22. A communication apparatus for using a first and second subscriber identifications at the same time for accessing a first and second telecommunication networks correspondingly, comprising:
a central controlling device, with a user interface, for receiving a command;
a first communication circuit, for accessing the first telecommunication network according to the first subscriber identification, wherein the first communication circuit comprises:
a first short message service module for processing short message receiving/sending operations corresponding to the first telecommunication network;
a second communication circuit, for accessing the second telecommunication network according to the second subscriber identification, wherein the first telecommunication network and the second telecommunication network correspond to a same telecommunication standard, wherein the second communication circuit comprises:
a second short message service module for processing short message receiving/sending operations corresponding to the second telecommunication network; and
a controller, coupled to the second communication circuit, for controlling the second communication circuit, wherein the central controlling device is coupled to the first communication circuit and the controller, and the first communication circuit and the controller are controlled by signals from the central controlling device;
wherein the controller further comprises:
a message transmission module, for reading a target message service center information stored in a system configuration file according to a subscriber configuration file of a message service center, and controlling the second communication circuit to send a message according to the target message service center information.

23. A communication apparatus for using a first and second subscriber identifications at the same time for accessing a first and second telecommunication networks correspondingly, comprising:
a central controlling device, with a user interface, for receiving a command;
a first communication circuit, for accessing the first telecommunication network according to the first subscriber identification, wherein the first communication circuit comprises:
a first short message service module for processing short message receiving/sending operations corresponding to the first telecommunication network;
a second communication circuit, for accessing the second telecommunication network according to the second subscriber identification, wherein the first telecommunication network and the second telecommunication network correspond to a same telecommunication standard, wherein the second communication circuit comprises:
a second short message service module for processing short message receiving/sending operations corresponding to the second telecommunication network; and
a controller, coupled to the second communication circuit, for controlling the second communication circuit, wherein the central controlling device is coupled to the first communication circuit and the controller, and the first communication circuit and the controller are controlled by signals from the central controlling device;
wherein the controller further comprises:
a message receiving module, for controlling whether or not the target short message is stored into the system storage device according to at least a type of the target short message received by the second communication circuit and a data storing state of the system storage device.

* * * * *